Aug. 7, 1951     C. A. GODSHALK ET AL     2,563,234
SAFETY THERMAL CONTROL SYSTEM FOR BATTERY CHARGERS
Filed Oct. 14, 1949     3 Sheets-Sheet 1

Inventors
CLARENCE A. GODSHALK
LEWIS A. MEDLAR,

By Stone, Boyden & Mack,
Attorneys

Aug. 7, 1951     C. A. GODSHALK ET AL     2,563,234
SAFETY THERMAL CONTROL SYSTEM FOR BATTERY CHARGERS
Filed Oct. 14, 1949     3 Sheets-Sheet 2
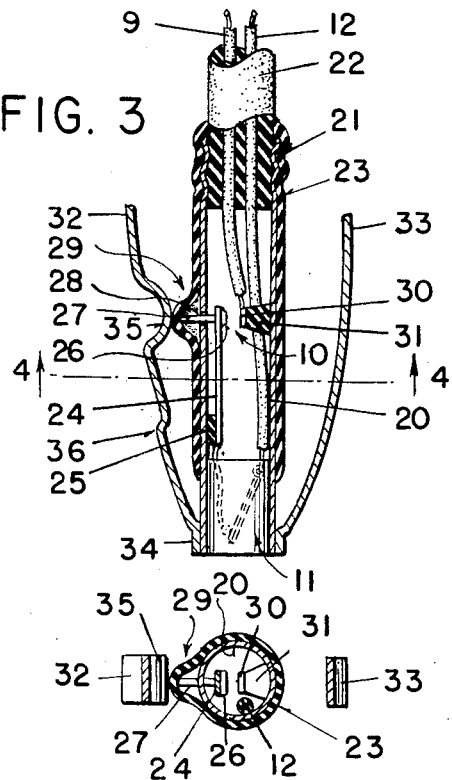
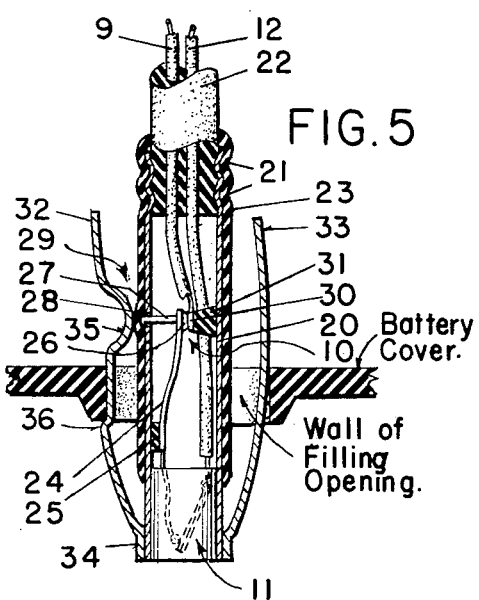
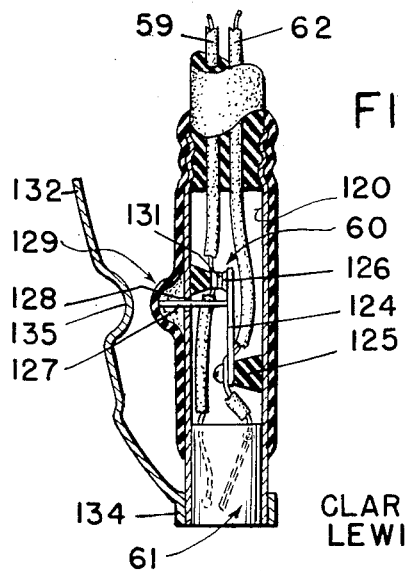
Inventors
CLARENCE A. GODSHALK
LEWIS A. MEDLAR,
By Stone, Boyden & Mack,
Attorneys Aug. 7, 1951 C. A. GODSHALK ET AL 2,563,234
SAFETY THERMAL CONTROL SYSTEM FOR BATTERY CHARGERS
Filed Oct. 14, 1949 3 Sheets-Sheet 3
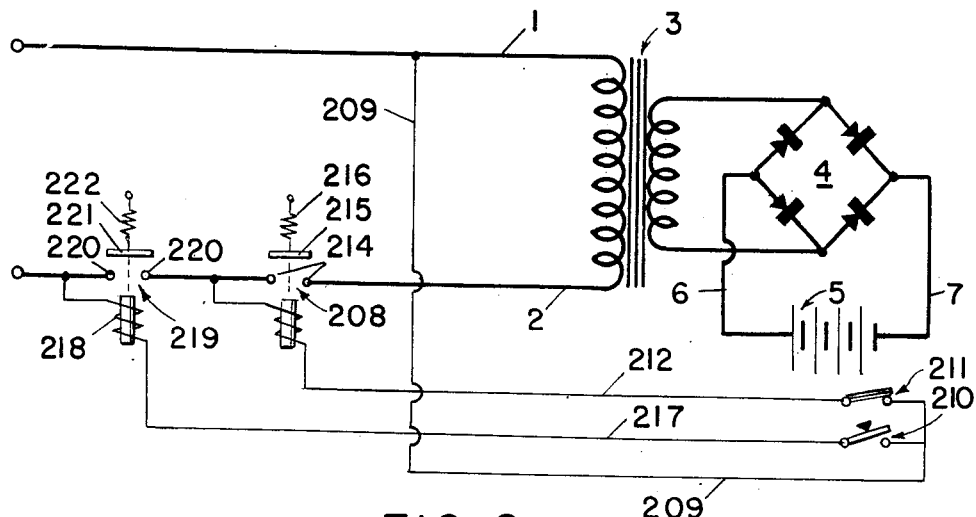
FIG. 9
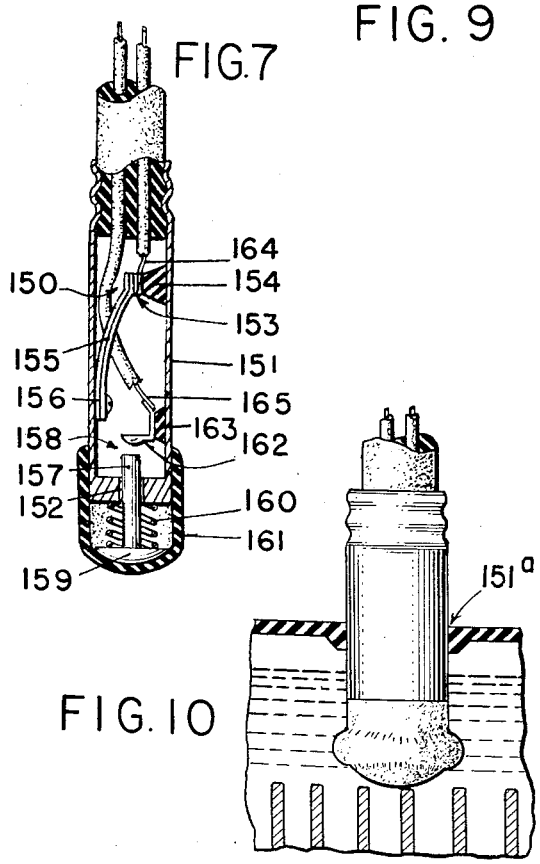
FIG. 7
FIG. 10
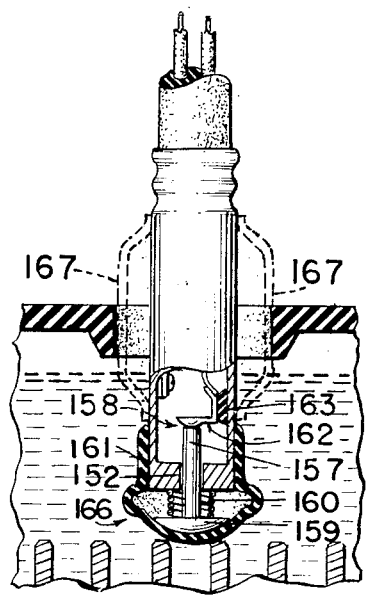
FIG. 8
Inventors
CLARENCE A. GODSHALK
LEWIS A. MEDLAR,
By Stone, Boyden & Mack,
Attorneys Patented Aug. 7, 1951

2,563,234

UNITED STATES PATENT OFFICE 2,563,234

SAFETY THERMAL CONTROL SYSTEM FOR BATTERY CHARGERS

Clarence A. Godshalk, Ardmore, and Lewis A. Medlar, Oreland, Pa., assignors, by mesne assignments, to Sterlingworth Company, Philadelphia, Pa., a corporation of Delaware Application October 14, 1949, Serial No. 121,294

7 Claims. (Cl. 320—36)

It has become common practice to employ with battery chargers some means responsive to the internal temperature of the battery being charged for regulating charging, either for the purpose of preventing over-heating of the battery or for the purpose of determining the duration of charging. Such means usually comprise a thermostat or other thermally sensitive device, a relay arranged to make and break the charging circuit, and a relay actuating circuit by means of which the temperature of the thermally sensitive element controls the position of the relay. The thermally responsive element is ordinarily carried by a casing constructed to be inserted through the filling opening of the battery.

Commercial use of battery chargers employing such thermal control devices has proved that some safety means is necessary for preventing the charging circuit from being energized when the thermally sensitive element has not been inserted in the battery, or when said element has accidentally been removed from the battery. Safety means for this purpose are disclosed broadly in co-pending application Serial No. 97,772, filed June 8, 1949, by Lewis A. Medlar, now Patent Number 2,499,663, issued March 7, 1950. As fully discussed in Patent 2,499,663, failure to insert the thermally sensitive element in the battery, or accidental removal of this element from the battery during charging, is likely to cause either one of two serious troubles, depending upon the particular type of charger and thermal control system employed. If the charger employs a time switch plus a thermal control circuit designed to de-energize the charger if a predetermined maximum safe internal battery temperature occurs during charging within the period for which the time switch is set, failure to insert the thermally responsive element is likely to result in the charge continuing after the battery has reached a dangerously high temperature, particularly if the initial temperature of the battery is high. If the charger is of the type wherein a thermally responsive control system is substituted for the time switch, and the operator fails to insert the thermally sensitive element or the element is removed from the battery after charging has started, then there is no effective means at all for terminating the charge, and the battery may be subjected to a damaging overcharge until the operator realizes his mistake.

In both instances, the thermally sensitive element is carried by a casing at the end of a relatively long electrical cable independent of the charging cables, and it is quite possible in normal use of the charger to neglect to insert the casing in the battery, or to displace the casing from the battery accidentally or inadvertently after charging has begun.

An object of the present invention is to provide in a thermally controlled battery charger, a device associated with the thermally sensitive element for preventing energization of the charging circuit unless said device has been actuated by mechanical contact with a part of the battery as the thermally responsive element is inserted therein.

A further object of the invention is to provide a safety thermal control system for battery chargers including a safety switch connected in the usual thermal control system, and switch actuating means operatively associated with the safety switch and arranged to be operated mechanically by contact with a part of the battery as the thermally responsive element of the thermal control system is inserted in the battery being charged, the connection of the safety switch in the control system being such as to prevent the control system from initiating a charging action unless the safety switch has been actuated by the switch actuating means.

Another object of the invention is to provide a safety thermal control system of the type described which may include as the thermally responsive element either a thermostatic switch or a thermally responsive impedance, and is equally applicable for either "fail-safe" or "non-fail-safe" operation.

Broadly, the invention comprises the provision in the thermally responsive control circuit of a battery charger of a switch associated with the thermally responsive element and normally occupying one position, in which the control circuit is prevented from completing the charging circuit, but being actuated to a second position, allowing the control circuit to complete the charging circuit, when the thermally responsive element is inserted in the battery. The manner in which this switch is connected in the control circuit, and whether the switch is normally open or normally closed, depends upon the specific nature of the control circuit. Actuation of the switch is accomplished by a switch operating device associated with the thermally responsive element and arranged to be operated by mechanical contact with some part of the battery, preferably the wall of the filling opening of the battery, as the thermally sensitive element is inserted in the battery.

In order that the invention may be readily understood, reference is had to the accompanying drawings, forming part of this specification and in which:

Fig. 1 is a schematic diagram of a battery charger constructed in accordance with the invention, employing a thermally responsive control circuit comprising a normally open relay, a normally closed thermostatic switch subjected to internal battery temperature and a normally open safety switch, the thermostatic switch and the safety switch being shown diagrammatically in this figure but in detail in Figs. 3–5;

Fig. 3 is a vertical sectional view of a preferred form of thermostatic switch unit constructed in accordance with the invention, parts being shown in elevation;

Fig. 4 is a horizontal sectional view taken on the line 4—4, Fig. 3;

Fig. 5 is a vertical sectional view of the thermostatic switch unit illustrated in Fig. 3, showing the relationship of the parts thereof when the unit has been inserted through the filling opening of a battery;

Fig. 6 is a vertical sectional view similar to Fig. 3, showing a thermostatic switch unit modified for use in the circuit illustrated in Fig. 2;

Fig. 7 is a vertical sectional view of a modified form of thermostatic switch unit which may be employed in accordance with the invention;

Fig. 8 is a vertical elevational view, partially in section, of the device shown in Fig. 7 inserted through the filling opening of a battery;

Fig. 9 is a schematic diagram of a battery charger constructed in accordance with the invention, employing a thermally responsive control circuit including a pair of relays, one controlled by a thermostatic switch subjected to the internal temperature of the battery and the other controlled by a safety switch associated with the thermostatic switch, and Fig. 10 is a vertical elevational view, partially in section, of a modification of the device shown in Fig. 7 inserted through the filling opening of a battery.

Figure 1:
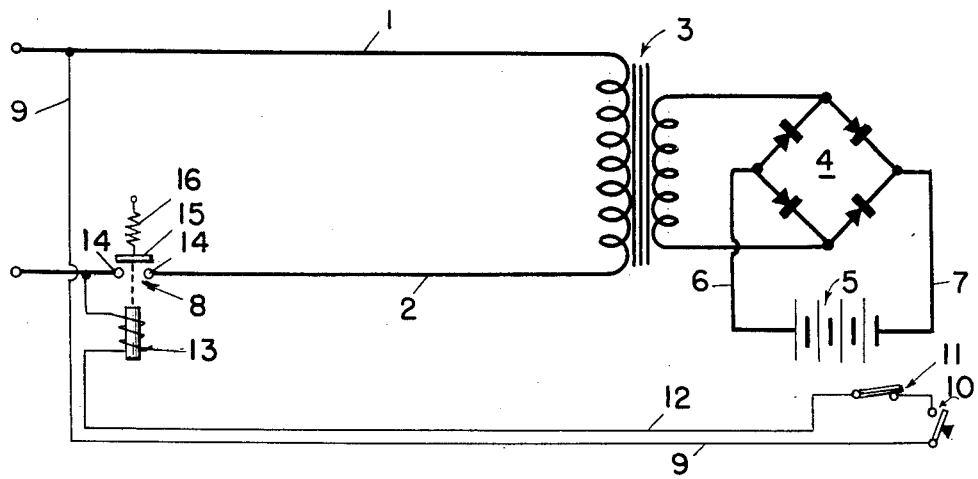

A battery charger constructed according to a preferred embodiment of the invention is illustrated diagrammatically in Fig. 1. The charging circuit comprises power leads 1 and 2 supplying the primary of a transformer 3, the secondary of transformer 3 being connected to a suitable rectifier 4, which in turn supplies charging current to battery 5 by means of leads 6 and 7. The thermally responsive control device comprises relay 8 and an actuating circuit therefor consisting of conductor 9 connected to power lead 1, normally open switch 10 to be hereinafter described, normally closed thermostatic switch 11 connected in series, and conductor 12, the latter being connected to power lead 2 through actuating winding 13 of relay 8. Relay 8 includes contacts 14 in power lead 2, and a contact closing element 15 normally held in open position, as by spring 16. Thermostatic switch 11 is constructed to open at a predetermined relatively high temperature, and the switch unit is adapted, as hereinafter more fully described, for insertion through the filling opening of a battery to be charged.

In operation, if switch 10 is closed and switch 11 at a relatively low temperature and therefore also closed, connection of power leads 1 and 2 to a suitable source of alternating current will establish current flow through conductor 9, switch 10, thermostatic switch 11, conductor 12, and relay winding 13. Resulting energization of winding 13 causes contacts 14 to be closed, allowing current to flow to transformer 3 and thus initiating charging of the battery 5. If thermostatic switch 11 is subjected to a temperature sufficiently high to cause it to open, the relay actuating circuit is broken, relay winding 13 is therefore de-energized, and contacts 14 are opened, interrupting charging. Similarly if switch 10 is open, the relay actuating circuit is broken, relay winding 13 de-energized and contacts 14 open, interrupting charging.

Thermostatic switch 11 is constructed to open at the maximum safe temperature of the battery to be charged, and is carried by a suitable casing, as will be described in detail with reference to Fig. 3, so constructed that the thermostatic switch unit can be inserted through the filling opening of the battery to charged and is thus subjected to the internal temperature of the battery. Switch 10, in this embodiment of the invention, is a normally open switch associated with the casing of the thermostatic switch. Suitable switch closing means is carried by the casing and so arranged as to close switch 10 when the casing is inserted in the battery. Thus, thermostatic switch 11 is initially closed when the charger is first connected to the battery, but the relay circuit cannot be energized to close contacts 14 of the relay 8, thus allowing charging, until switch 10 has been closed as a result of insertion of the thermostatic switch unit in the battery.

Referring now to Figs. 3 and 4, thermostatic switch 11, illustrated diagrammatically, is carried within a tubular metal casing 20 crimped at 21 in fluid tight relation over the insulating sheath of a conventional flexible electrical cable 22 comprising the previously mentioned conductors 9 and 12. Casing 20 is provided with a flexible insulating cover 23, preferably of rubber. Conductor 12 is connected directly to one terminal of thermostatic switch 11. The other terminal of switch 11 is connected to spring contact arm 24 of switch 10, this contact arm being secured to but insulated from casing 20 at 25 in any suitable conventional manner. Spring contact arm 24 carries one contact 26 of switch 10 and also carries a pin 27 extending through an opening 28 in casing 20. The normal position of contact arm 24 is such that pin 27 is caused to yieldingly project outwardly as shown, distending insulating cover 23 in a pronounced hump at 29. Switch 10 also includes a stationary contact 30 carried by a suitable insulating member 31 secured to casing 20.

The switch actuating means for automatically closing switch 10 when casing 20 is inserted in the battery preferably comprises a pair of divergent resilient arms 32 and 33 arranged on diametrically opposite sides of casing 20 as shown and carried by a ring-like member 34 surrounding the casing near its tip. It will be noted that flexible rubber covering 23 extends only for a portion of the length of casing 20, so that member 34 may be secured directly to the outer surface of the casing. Resilient arms 32 and 33 diverge to an extent such that, at their free ends, they are normally spaced apart a distance greater than the diameter of the filling opening of the battery to be charged. Arm 32 is provided with a portion 35 offset toward and normally resting lightly against the extended portion 29 of cover 23.

As shown in Fig. 5, insertion of the thermostatic switch unit into the battery through the filling opening causes divergent arms 32 and 33 to engage the wall of the filling opening, and the arms are thus forced together. As the two arms are forced together, portion 35 of arm 32 depresses extending portion 29 of cover 23, thereby moving pin 27 against the resilience of arm 24 until switch 10 is closed. When the unit is fully inserted in the battery, as is shown in Fig. 5, arms 32 and 33 are maintained compressed toward each other, and switch 10 is held closed. One or both of the divergent arms may be provided with an outwardly bent portion 36 to engage the lower edge of the wall of the filling opening and thus lock the unit in place. Alternatively, this bent portion may be omitted and the resilience of arms 32 and 33 may be such as to lock the unit in place by the friction between the arms and the wall of the filling opening.

Referring again to Fig. 3, it will be seen that, while conductor 12 is connected directly to one terminal of thermostatic switch 11, conductor 9 is connected to the other terminal of that switch only through normally open switch 10. Thus, if the thermostatic switch unit has not been inserted in the battery, switch 10 will be open, breaking the relay actuating circuit, Fig. 1, and so preventing charging. But, when the thermostatic switch unit has been inserted in the battery as illustrated in Fig. 5, compression of arms 32 and 33 by the wall of the battery opening causes switch 10 to be closed, completing the relay actuating circuit, energizing relay 8, Fig. 1, and so completing the charging circuit. Should the thermostatic switch unit be accidentally removed, arms 32 and 33 will spring apart, switch 10 will open by reason of the resilience of contact arm 24, and, since opening of switch 10 interrupts the relay actuating circuit, relay 8 reverts to its normally open position, interrupting charging.

Figure 2:
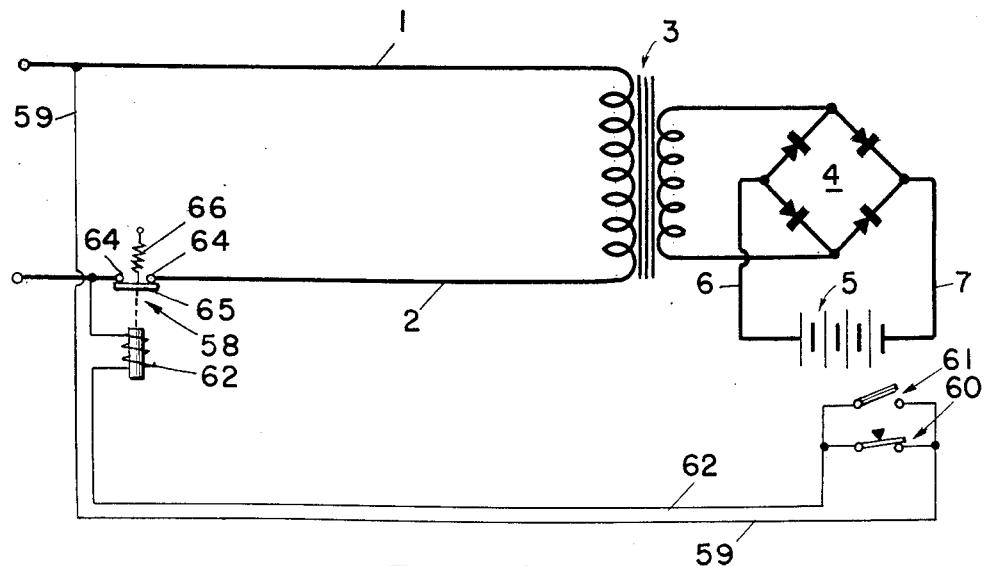
Fig. 2 is a schematic diagram of a battery charger similar to that shown in Fig. 1, but with the control circuit being arranged for non-fail-safe operation.

The circuit illustrated in Fig. 1, employing the switch unit shown in Figs. 3–5, is advantageous in that the thermally responsive control circuit operates on a fail-safe basis, that is, most failures of the switch unit or the control circuit result in opening of relay 8. But it is not necessary that, in order to employ the invention, the thermally responsive control circuit be arranged for fail-safe operation. In Fig. 2, the invention is shown as embodied in a battery charger including a thermally responsive control circuit operating on a non-fail-safe basis, that is, with the relay maintained normally closed to allow charging, but being energized to open position by closing a normally open thermostatic switch in the relay actuating circuit. The relay 58, corresponding to relay 8 of Fig. 1, includes contacts 64 in power lead 2, and a contact closing element 65 normally biased to close contacts 64, as by spring 66, the contact closing element 65 being adapted for movement to open position, breaking contacts 64, in response to energization of relay winding 63. Winding 63 is connected across the power leads 1 and 2 of the charging circuit by conductors 59 and 62 with a normally open thermostatic switch 61 being connected with series with the winding as shown. Connected in parallel with thermostatic switch 61 is a normally closed switch 60 corresponding to switch 10 of the circuit shown in Fig. 1. As was the case with switch 10, switch 60 is carried by the casing which carries the thermostatic switch. The same casing and switch actuating structure shown in Figs. 3–5 can be employed.

As shown in Fig. 2, the relay actuating circuit is again connected across the charger supply circuit on the line side of the relay. When the charger is first connected to a battery, thermostatic switch 61 is open, since its temperature is below the actuating point, and were it not for normally closed switch 60, relay winding 63 would be de-energized and relay contact 64 therefore closed regardless of whether or not the thermostatic switch were inserted in the battery. But normally closed switch 60 shunts the thermostatic switch from the actuating circuit unit switch 60 is opened by insertion of the thermostatic switch unit in the battery. Therefore, if thermostatic unit is not in the battery, relay winding 63 will be energized by reason of the completed actuating circuit comprising conductor 59, switch 60, and conductor 62, with the result that contacts 64 will be broken, preventing charging. When switch 60 is actuated to open position as the thermostatic switch unit is inserted in the battery, winding 63 will remain de-energized, and contacts 64 therefore closed, until thermostatic switch 61 closes upon occurrence of a predetermined high battery temperature, or until switch 60 is allowed to return to its normally closed position by removal of the unit from the battery.

The manner in which the switch operating mechanism illustrated in Fig. 3 can be employed to operate switch 60 is shown in Fig. 6. The general organization is similar to that of Fig. 3 and will not be described in detail. Casing 120 is provided with lateral opening 128 through which extends switch operating pin 127 secured to electrically conductive spring contact arm 124 of switch 60. Arm 124 carries contact 126 and itself is supported in the casing by insulation at 125. Pin 127 is normally held outward, distending flexible rubber covering 123 at 129. Conductor 59 is connected to stationary contact 131, and thence to one terminal of normally open thermostatic switch 61. Conductor 62 is connected to contact arm 124, and thereby to contact 126 of switch 60. Contact arm 124 is connected to the remaining terminal of thermostatic switch 61. Resilience of arm 124 normally maintains switch 60 closed. Opening of switch 60 when the unit is inserted in the battery is accomplished by spring arm 132 secured to the casing at 134 and provided with offset portion 135 as shown. As the unit is inserted in the battery, arm 132 is bent toward casing 120, by contact with the wall of the battery filling opening, causing portion 135 to engage the rubber cover at 129 and open switch 60 by motion of pin 127. It will be noted that only one resilient arm is provided for engagement with the filling opening wall. In this case, arm 132 engages the wall at one point, and cover 123 of casing 120 engages the wall at a point diametrically opposite. The spacing between arm 132 and the far side of the casing is thus required to be sufficiently greater than the diameter of the filling opening to provide sufficient motion of pin 127 as the unit is inserted in the battery.

In the safety devices shown in Figs. 3–6, actuation of the switch operating means is caused by mechanical engagement of a resilient arm with the wall of the battery filling opening. The same results can be obtained by employing, instead of the resilient arm, a spring-biased plunger operated by engagement with the top of the battery plates, as will now be described with reference to Fig. 7, where a unit suitable for use with the circuit of Fig. 1 is illustrated. Normally closed thermostatic switch 150 is carried by a tubular casing 151 provided at its tip with a longitudinal bore 152. Switch 150 comprises a stationary contact 153 secured to the casing by a suitable insulating member 154, and a movable bi-metallic contact arm 155. The end of arm 155 is connected directly to the casing 151 at 156, while the other end is arranged to flex into and out of contact with stationary contact 153. Slidably positioned in bore 152 is movable contact pin 157 of normally open switch 158. Pin 157 is provided at its outer end with an enlarged head 159, and an electrically conductive spring 160 is positioned between head 159 and the tip of casing 151 to hold pin 157 in an outward position. A flexible insulating cover 161 encloses the head 159, spring 160, and the tip of casing 151 as shown. Normally open switch 158 also includes stationary contact 162 supported from the casing wall by insulation at 163 in any suitable conventional manner.

Stationary contact 153 of thermostatic switch 150 is connected to conductor 164, corresponding to conductor 12, Fig. 1, while stationary contact 162 of switch 158 is connected to conductor 165, corresponding to conductor 9, Fig. 1. The unit provides a series circuit consisting of conductor 164, switch 150, casing 151, spring 160, contact pin 157 and contact 162 of switch 158, and conductor 165. Thermostatic switch 150 is constructed to be normally closed below a predetermined temperature. But the series circuit just described is normally broken by switch 158. It will be obvious that the unit illustrated in Fig. 6 can be connected in the relay actuating circuit of the battery charger illustrated in Fig. 1, with switches 150 and 158, Fig. 6, replacing switches 11 and 10, respectively, of Fig. 1, and in that event, relay 8 will be maintained de-energized and open so long as switch 158 is open.

Switch 158, as will be seen from Fig. 8, is adapted to be closed, against the action of spring 160, by action of the weight of the thermostatic unit forcing head 159 and its associated flexible covering against the tops of the battery plates when the unit is inserted in the battery. When the unit is removed from the battery, spring 160 causes switch 158 to open. Flexible covering 161 is, of course, displaced as at 166 by this closing action, but at all times seals the interior of the unit against entrance of electrolyte. If desired, the casing of the switch shown in Figs. 7 and 8 may be made of sufficient diameter to form a friction lock against the wall of the filling opening of the battery, as shown at 151ª, Fig. 10. Alternatively, spring arms may be employed, as indicated by dotted lines at 167, Fig. 8, to accomplish the same effect.

In Fig. 9, the invention is illustrated as embodying a pair of relays having contacts in the charging circuit, one relay being controlled by a thermostatic switch and the second relay being controlled by a switch operated by contact with a portion of the battery when the thermostatic witch unit, which may be of the type shown in Figs. 3–5, is inserted through the filling opening of the battery.

A first relay 208 includes an actuating winding 213 connected across power leads 1 and 2 by an actuating circuit comprising conductor 209, normally closed thermostatic switch 211, and conductor 212. Relay 208 has contacts 214 in power lead 2, and includes contact closing element 215, normally held in open position, as by spring 216 but adapted to be moved to a position closing contacts 214 in response to energization of winding 213. A second relay 219 includes an actuating winding 218 connected across power leads 1 and 2 by conductor 209, normally open switch 210 and conductor 217. Like relay 208, the second relay 219, is normally open, contact closing member 221 being moved out of engagement with the contacts 220 by spring 222 whenever winding 218 is de-energized.

Thermostatic switch 211 and normally open switch 210 are incorporated in a switch unit of the type shown in Figs. 3–5, and the structure of this switch unit may remain substantially the same as shown in Figs. 3–5, except for the use of a three-conductor flexible cable to provide conductors 209, 212, and 217. Thermostatic switch 211 is normally closed but constructed to open at a predetermined relatively high temperature. Switch 210 is normally open but, by reason of use of the switch closing structure illustrated in Figs. 3–5, is adapted to be closed whenever the switch unit is inserted in the battery and to return to its normally open position when the switch unit is removed from the battery. Since relay 219 will not close to complete power lead 2 until winding 218 is energized, and since normally open switch 210 is in series with the winding 218 in its actuating circuit, the charging circuit will remain broken so long as the switch unit is not inserted in the battery. Insertion of the thermostatic switch unit into the battery causes switch 210 to be closed, energizing winding 218 to close contacts 220. If the internal temperature of the battery is sufficiently low that the thermostatic switch 211 is closed, and winding 213 of relay 208 therefore energized to close contacts 214, charging will then proceed. Should the internal temperature of the battery exceed the predetermined maximum, thermostatic switch 211 will open, causing winding 213 to be de-energized and contacts 214 therefore to be opened, interrupting charging. Should the thermostatic switch unit be accidentally removed from the battery while the charger is still connected, switch 210 is automatically opened by the mechanism shown in Figs. 3–5, winding 218 of relay 219 is therefore de-energized, and contacts 220 are accordingly opened to prevent further charging.

We claim:

1. In a battery charger, the combination of a charging circuit, a thermally sensitive element, a two-position safety switch normally biased to a first position, a single casing carrying both said element and said switch and constructed for insertion through the filling opening of the battery to be charged, switch operating means carried by said casing and operatively associated with said safety switch, said switch operating means being normally biased to an inactive position relative to said switch and arranged for displacement from said inactive position by mechanical contact with a portion of the battery, as said casing is inserted therein, to actuate said switch to its second position, and relay means controlled by said element and said switch for interrupting said charging circuit whenever said switch is in its first position or the temperature of said element is above a predetermined value.

2. In a battery charger, the combination of a charging circuit, a relay arranged to make and break said charging circuit, a thermally sensitive element, a two position safety switch normally biased to a first position, a single casing containing both said thermally sensitive element and said safety switch and constructed for insertion through the filling opening of the battery to be charged, switch operating means carried by said casing and operatively associated with said safety switch, said switch operating means being biased to an inactive position relative to said safety switch and arranged for displacement from said inactive position by mechanical contact with a portion of the battery, as said casing is inserted therein, to operate said switch to a second position, and a relay control circuit including said safety switch and said thermally sensitive element and arranged to cause said relay to interrupt said charging circuit whenever the temperature of said thermally sensitive element is above a predetermined value or said safety switch is in said first position.

3. In a battery charger, the combination of a charging circuit, a normally open relay having an actuating winding and arranged to complete said charging circuit only when said winding is energized, a normally closed thermostatic switch, a normally open safety switch, a relay control circuit including said winding, said thermostatic switch and said normally open safety switch in series, a single casing containing both said safety switch and said thermostat and constructed for insertion through the filling opening of the battery to be charged, and switch operating means carried by said casing and operatively associated with said safety switch, said switch operating means being biased to an inactive position relative to said safety switch and arranged for displacement from said inactive position by mechanical contact with a portion of the battery, as said casing is inserted therein, to operate said safety switch to closed position.

4. In a battery charger, the combination of a charging circuit, a normally closed relay having an actuating winding and arranged to complete said charging circuit when closed and to interrupt said charging circuit when said winding is energized, a normally open thermostatic switch, a relay control circuit including said winding and said thermostatic switch in series, a normally closed safety switch connected in said relay control circuit in parallel with said thermostatic switch, a single casing containing both said safety switch and said thermostat and constructed for insertion through the filling opening of the battery to be charged, and switch operating means carried by said casing and operatively associated with said safety switch, said switch operating means being biased to an inactive position relative to said safety switch and arranged for displacement from said inactive position by mechanical contact with a portion of the battery, as said casing is inserted therein, to operate said safety switch to open position.

5. In a battery charger, a charging circuit, a thermally sensitive element, a two-position switch, a single casing carrying both said element and said switch and being constructed for insertion in the battery to be charged, said switch being normally biased to a first position, switch actuating means for moving said switch to its second position, said switch actuating means being carried by said casing and arranged to be operated by mechanical engagement with a part of the battery as said casing is inserted therein, means controlled by said thermally sensitive element for interrupting said charging circuit only when the temperature of said element is above a predetermined value, and means controlled by said switch for interrupting said charging circuit only when said switch is in its normally biased position.

6. In a battery charger, a charging circuit, a first relay arranged to make and break said charging circuit, an actuating circuit for said first relay including a thermally sensitive element and arranged to cause said first relay to complete said charging circuit so long as the temperature of said element is below a predetermined value and to cause said first relay to interrupt said charging circuit when the temperature of said element reaches said predetermined value, a casing carrying said thermally sensitive element and constructed for insertion through the filling opening of the battery to be charged, a second relay arranged to make and break said charging circuit, an actuating circuit for said second relay including a two position switch and arranged to cause said second relay to interrupt said charging circuit when said switch is in its first position and to complete said charging circuit when said switch is in its second position, said switch being normally biased to its first position and carried by said casing, and means carried by said casing whereby said switch is automatically actuated to its second position as said casing is inserted through the filling opening of the battery.

7. In a battery charger, a charging circuit; first and second relays having contacts in series relation in said charging circuit, an actuating circuit for said first relay including a thermally sensitive element and arranged to cause said first relay to close to complete said charging circuit whenever the temperature of said element is below a predetermined value and to cause said first relay to open to interrupt said charging circuit when the temperature of said element reaches the predetermined value, a casing carrying said element and constructed for insertion through the filling opening of the battery to be charged, an actuating circuit for said second relay including a two-position switch and arranged to cause said second relay to open to interrupt said charging circuit when said switch is in its first position and to close to complete said charging circuit when said switch is in its position, said switch normally occupying its first position and being carried by said casing, and switch actuating means carried by said casing and arranged to be operated by engagement with a part of the battery as said casing is inserted therein, said switch actuating means when so operated causing said switch to be moved to its second position.

CLARENCE A. GODSHALK.
LEWIS A. MEDLAR.

REFERENCES CITED

The following references are of record in the file of this patent:

UNITED STATES PATENTS

| Number | Name | Date |
| --- | --- | --- |
| Re. 22,883 | Heyer | May 27, 1947 |
| 1,457,863 | Strawmyer et al. | June 5, 1923 |
| 1,956,067 | Herz | Apr. 24, 1934 |
| 2,354,877 | Peters | Aug. 1, 1944 |
| 2,392,737 | Heyer | Jan. 8, 1946 |
| 2,499,663 | Medlar | Mar. 7, 1950 |

Certificate of Correction

Patent No. 2,563,234                                                              August 7, 1951

CLARENCE A. GODSHALK ET AL.

It is hereby certified that error appears in the printed specification of the above numbered patent requiring correction as follows:

Column 6, line 15, for "unit" read *until*; column 10, line 49, before "position" insert *second*;

and that the said Letters Patent should be read as corrected above, so that the same may conform to the record of the case in the Patent Office.

Signed and sealed this 11th day of December, A. D. 1951.

[SEAL]

THOMAS F. MURPHY,
*Assistant Commissioner of Patents.*